June 8, 1954 K. MAYBACH 2,680,381
MOTOR VEHICLE DRIVING MECHANISM
Filed Dec. 28, 1949 2 Sheets-Sheet 1

Inventor
Karl Maybach
by Karl Michaelis, Atty.

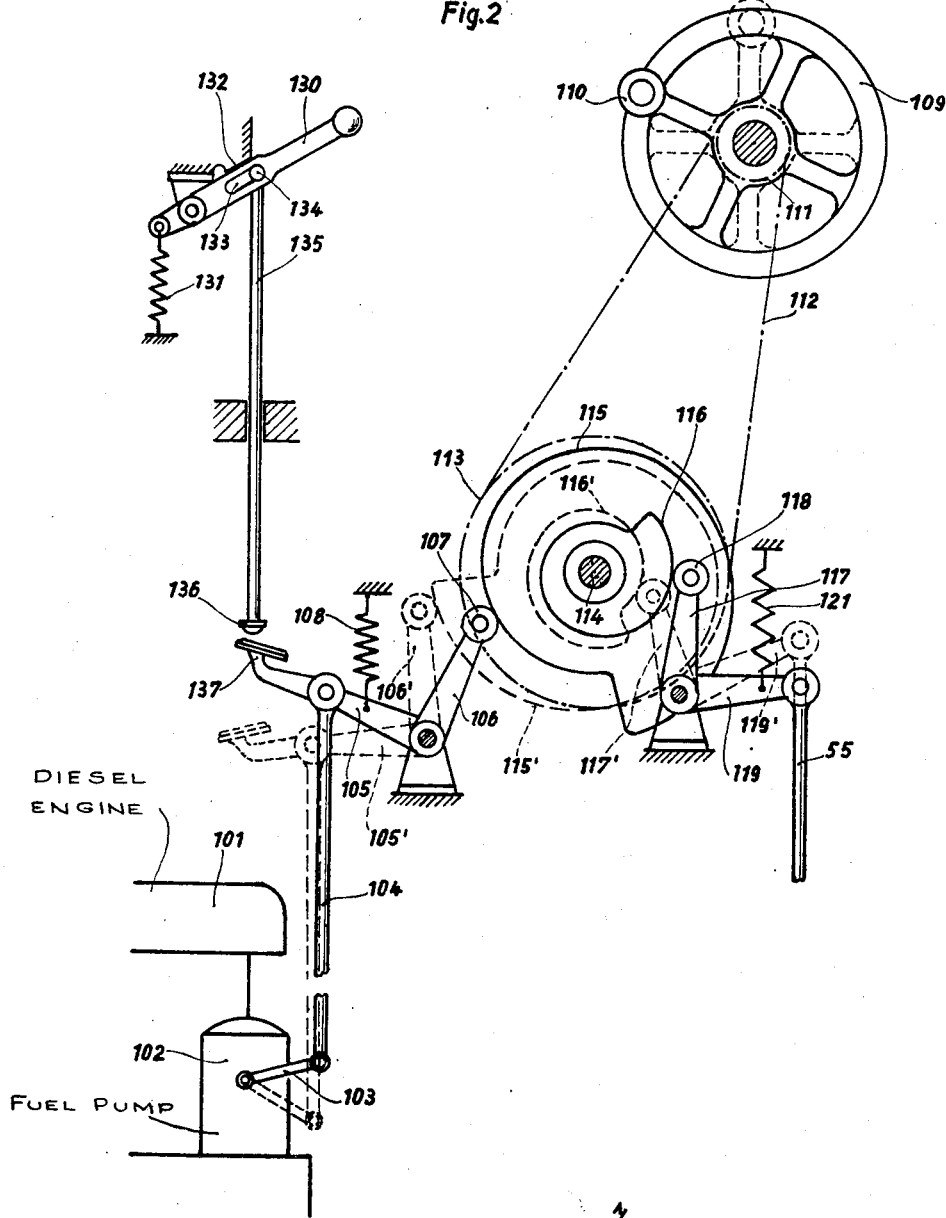

UNITED STATES PATENT OFFICE 2,680,381

MOTOR VEHICLE DRIVING MECHANISM

Karl Maybach, Friedrichshafen, Germany

Application December 28, 1949, Serial No. 135,404

Claims priority, application Germany
December 30, 1948

5 Claims. (Cl. 74—472)

This invention concerns a mechanism for regulating the fuel supply to an internal combustion engine having an automatic gear change mechanism connected with the engine, and comprising an additional mechanism for varying the engine speed (R. P. M.) at which a gear change is effected, in such relation to the power output variations of the driving engine, that the engine speed at which automatic gear change is effected is greater when the output of the engine is greater.

The aforesaid additional mechanism was recently introduced in power vehicles for the purpose of lowering the number of revolutions of the engine required for a given distance travelled by the vehicle, so as to reduce wear and tear of the engine and to reduce fuel consumption when running on part load.

The invention is especially intended for use in power vehicles for heavy loads and having relatively large rotating masses. With this type of vehicle, the driver is unable to judge by ear the running of the engine, and, even if this were possible, continuous observation of the running of the engine and frequent gear changes cannot be expected of the vehicle driver. Even a highly skilled driver would not shift the gears at the most favourable moments. The vehicles for which the invention has special advantages are locomotives, motorized railway cars, tramways, large omnibuses and the like. With such vehicles automatic gear changing mechanisms are a necessity because, for example with a large town omnibus, several thousand gear changes are necessary each day. Up till now, however, automatic gear change mechanisms could not be introduced to any large extent on these vehicles primarily because, without the additional mechanism mentioned above for adjusting the engine speed at which gear change occurs correspondingly to the load, the engine operates on part load at an unnecessarily high speed.

This can usually be corrected on street vehicles by the vehicle driver by means of gear changing since he notices the high engine speed by the noise of the engine. With many vehicles, however, and especially with rail vehicles, this is not possible. If the engine speed at which gear change occurs is changed correspondingly to the load, no additional gear changes by the driver are required. Gear shifting is effected at the correct moment and much more accurately than by the most experienced driver.

On a vehicle comprising a mechanism for the variation of the gear change speeds and an automatic gear changing mechanism, the driver is relieved of gear changing and fuel consumption as well as wear is reduced because of the reduced engine revolutions per kilometre travelled. In such vehicles, if, for example when operating with the fourth speed gear of six gears the vehicle driver closes the throttle and thereby automatically lowers the gear ratio, shifting to higher speed gear is immediately effected by the automatic gear change mechanism and the engine speed is correspondingly lowered. If the vehicle driver opens the throttle, shifting to lower speed gears is automatically effected until the vehicle travels again in the previously used gear and with the previous engine performance.

The result of this is that, for example with locomotives or motorized railway cars which are quickly passing through switches into stations, or with street vehicles running on short descending sections, upward gear changes would be induced by the automatic gear changing mechanism which, shortly afterwards, must be changed downwards again. Also, for example, with omnibuses with short reductions of engine performance in traffic for the purpose of overtaking or braking and immediately thereafter again increasing the output of the engine, upward gear changings and shortly following thereafter downward gear changings are not desired.

By means of the regulating mechanism according to the invention these disadvantages are avoided and, whilst completely retaining the automatic operation, gear changes which are not necessary are prevented, so that as in a vehicle with manual gear shifting means operation in the previous gear is instantly resumed at the previously used most favourable engine speed and performance when the throttle is again opened.

According to the invention a mechanism is provided which, upon reduction of the driving power, blocks the mechanism for varying the engine speed at which gear change occurs.

A delaying mechanism is preferably arranged in combination with the mechanism for the variation of the gear change speeds for delaying the actuation of the mechanism for the variation of the gear change speeds upon reduction of the engine output. This is of particular importance, for example, for omnibuses.

For rail vehicles and street vehicles operating under similar driving conditions it is advantageous to provide a mechanism for changing the output of the engine and for simultaneously changing the gear shifting speeds, together with a mechanism for solely changing the driving power without simultaneous variation of the gear change speeds. This latter mechanism can also be so constructed that it produces temporary blocking or (in combination with a retarding mechanism) delay of the variation of the gear change speeds. At temporarily necessary relatively short throttling operations the former mechanism is left unchanged, which is especially desirable with mechanisms which require, for example, many revolutions of a hand wheel for disconnecting, and only the second mechanism is returned to its zero position. Thereby the gear change speeds are not changed. On opening the throttle again, the previous gear speed, engine speed, and driving power are available.

The invention will be further described by way of example with reference to the accompanying drawings in which:

Fig. 2 is a diagrammatic illustration of a regulating mechanism according to the invention for a rail vehicle (locomotive or motorized rail car).

Figure 1:
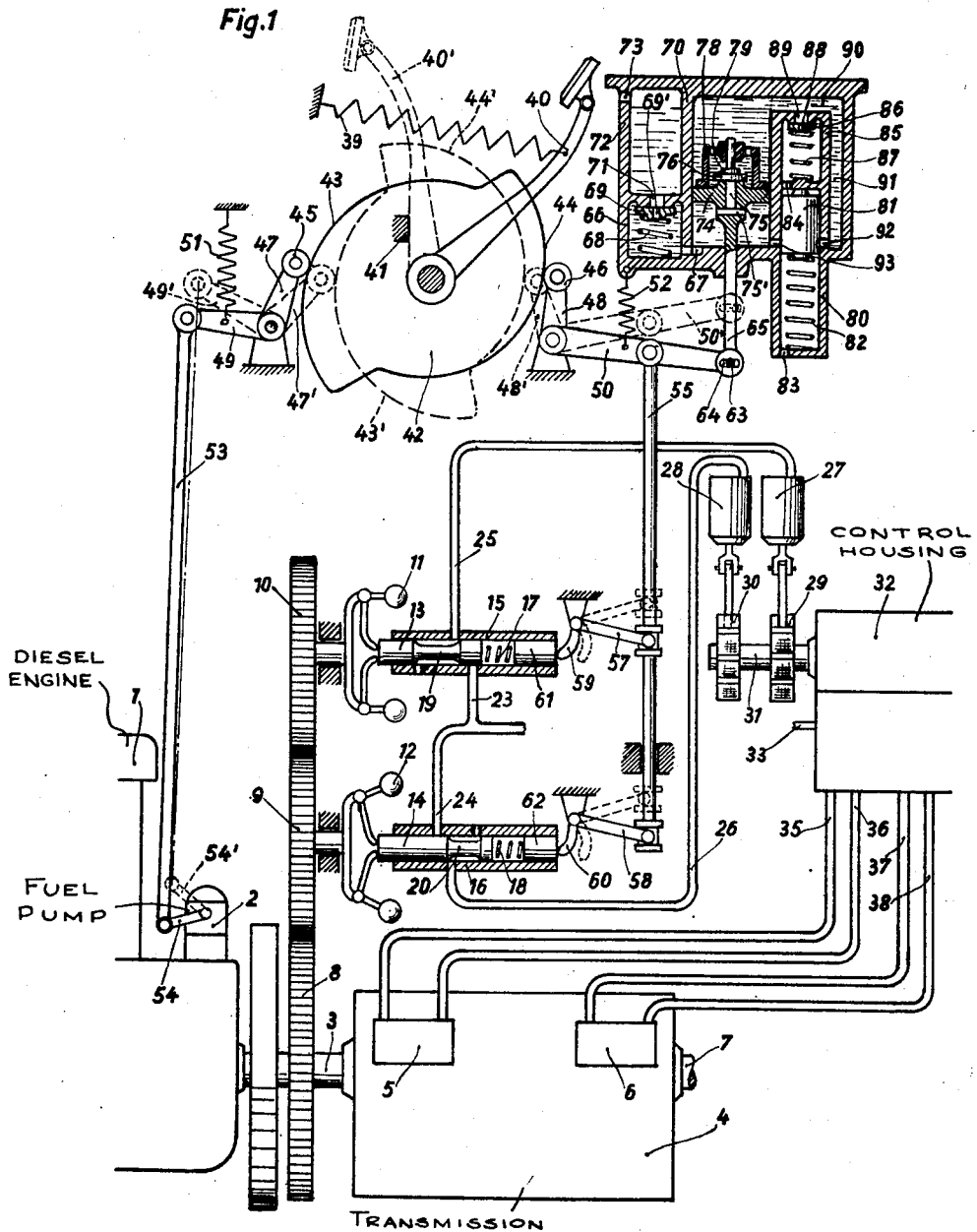
Fig. 1 is a diagrammatic part sectional illustration of a regulating mechanism according to the invention for a street vehicle.

Referring to Fig. 1, numeral 1 designates a diesel engine having a fuel pump 2. The diesel engine 1 drives a change speed gear transmission in a gearbox 4 by means of a shaft 3, the gear changes of the transmission being effected by means of pressure oil cylinders 5 and 6. The output shaft 7 of the transmission drives the vehicle axles by means, not shown. Numerals 8, 9 and 10 designate spur gear wheels driving centrifugal governors 11 and 12 decreasing and increasing the gear ratio of the transmission. These governors actuate displaceable slide valves 13 and 14 in housings 15 and 16 against the pressure of springs 17 and 18 respectively. Valves 13 and 14 have narrow portions 19 and 20, respectively. Pressure oil supplied through a conduit 22 is conducted to the housings 15 and 16 through conduits 23 and 24 respectively. Pressure oil controlled by the slide valves 13 and 14 is conducted through conduits 25 and 26 to cylinders 27 and 28, respectively, inside of which pistons (not illustrated) operate by means of rods and pawls ratchet wheels 29 and 30 which revolve a cam shaft 31 projecting from a housing 32. Numeral 33 designates a conduit supplying a pressure fluid to the control housing 32, which is connected by conduits 35, 36, 37, 38 to the gear change cylinders 5 and 6. Numeral 40 designates a foot lever which is pulled by a spring 39 against an abutment 41 and on the swing axis of which a disc 42 is arranged. The latter is provided with two cams 43 and 44. The dotted lines 40' show the foot lever 40, in rest position corresponding to the positions 43' and 44' of the cams 43 and 44. Rollers 45 and 46 bearing against the cams 43 and 44 are mounted on levers 47 and 48 with which levers 49 and 50, respectively, are connected. Tension springs 51 and 52 tend to pull the levers 49 and the positions indicated by dotted lines 47', 48', 49' and 50' corresponding to the position 40' of the foot lever. 53 is a connecting rod between the lever 49 and a lever 54 disposed on the regulating shaft of the fuel pump 2. 55 is a rod pivoted to the lever 50, the lower end of which is connected with levers 57 and 58, which individually engage an end surface of pistons 61 and 62 through fingers 59 and 60, respectively. Springs 17 and 18 abut against the other end surfaces of the pistons 61 and 62. A pin 63 disposed at the free end of the lever 50 is slidable in a suitable cross-guide 64 on the end of a piston rod 65.

66 is a valve housing, forming a chamber the interior of which is connected by means of an opening 67 with the lower part of the interior of a cylinder 70, the upper wall of housing 66 being provided with a channel 71 which is closed by a valve 69 pressed thereagainst by a spring 68. The valve 69 has a throttle orifice 69'. Above the valve housing 66 is an oil reservoir 72 which is connected to the outside at its upper end through an opening 73.

A piston 74 slides in the cylinder 70 which is filled with oil, piston 74 being connected with the lever 50 by means of a rod 65. A longitudinal bore 75 and a cross bore 75' are arranged in the piston 74. The upper end of the longitudinal bore 75 extends through a valve seat which is closed by a plate valve 76. The valve 76 is in a housing 78 on the head side of piston 74. Its stroke is limited by an abutment 79.

Numeral 80 designates a cylinder in which a slide valve 81 is displaceable against the pressure of a spring 82. 83 is an opening connecting the housing 80 to the outside. Numeral 84 designates a port connecting the interior of the cylinder 80 with a compartment 85 disposed thereabove. A valve 86 having a throttle opening 88 is pressed against the upper wall of compartment 85 by a spring 87 for closing an aperture 89 in said upper wall. Aperture 89 communicates with a transverse channel 90 communicating with a longitudinal channel 91. The interior of the cylinder 80 is connected with the channel 91 by means of an aperture 92 and with the interior of the cylinder 70 by means of a port 93.

In Fig. 2 numeral 102 designates the fuel pump of a diesel engine 101, the control of the fuel pump being effected through a lever 103 to which a rod 104 is pivoted. The latter is connected with a lever 105 which is connected to a lever 106 and is drawn upwardly by means of a tension spring 108. A plate 137 is disposed at the free end of the lever 105. The end of the lever 106 carries a roller 107. 109 is a hand wheel which can be turned by the vehicle driver by means of a handle 110 and on the axis of which a small chain wheel 111 is arranged from which, by way of a chain 112, a large chain wheel 113 is driven. Wheel 113 is mounted on an axle 114 together with two cams 115 and 116. The roller 107 of the lever 106 bears on the cam 115, a roller 118 mounted on a lever 117 bearing against the cam 116. The lever 117 is connected with a lever 119 to which the rod 55 is pivoted, lever 119 being pulled upwardly by means of a spring 121 so that the roller 118 is always pressed against the cam 116. The positions of the cams 115 and 116 shown in dotted lines 115' and 116' correspond to the smallest output of the fuel pump 102.

Numeral 130 designates a hand lever which is held against an abutment 132 by means of a spring 131. The lever 130 has a slot 133 in which a pin 134 at the end of a rod 135 is guided. A knob 136 is provided at the other end of the rod.

Referring to Fig. 1, while the vehicle is moving and the foot lever 40 is in the position drawn in full lines which corresponds at the corresponding position of the cam 43 and of the levers 47 and 49 to an output of the fuel pump 2 of about three-quarters of its maximum output. The diesel engine 1 operates at somewhat below its maximum speed. Cam 44 is also in the position drawn in full lines and the adjusting levers 48 and 50 are also in the positions indicated in full lines. The fingers 59 and 60 are held by means of the levers 57 and 58 and rod 55 in the position shown in full lines and the force exerted by the springs 17 and 18 on the pistons 61 and 62 is greater than the force exerted when the device was in the position shown in dotted lines. The speed of rotation of the shaft 3 at which the automatic gear changing mechanism in the housing 32 is actuated by the governors 11 and 12 is, therefore, increased corresponding to the selected power output.

The cylinder 70 is filled with oil above and below the piston 74 as also are the channels 90 and 91, the valve housings 66 and 85 and the cylinder 72 approximately to the illustrated level. On movement of the lever 50 and of the adjusting rod 55 for the speed governors 11 and 12 in a downward direction, the piston 74, arranged in the cylinder 70, is moved down from its upper end position whereby the valve 76 is unseated due to the reduced oil pressure below the valve and oil escapes upwardly from the space below the piston 74 through the passage formed by the bores 75' and 75. The valve 86 remains closed because the spring 85 does not permit opening until a certain excess pressure obtains above the piston 74. The piston 81 remains in the illustrated position since a pressure which is not sufficient to overcome the tension of the spring 82 acts against its upper end surface.

If the vehicle driver releases the foot lever 40 to move it into the position 40', the cam 43 moves to the position 43' and the lever 47 moves to the position 47'. Upon movement of the lever 49 to the position 49' the rod 53 and the lever 54 on the fuel pump is brought into the position 54'. The fuel pump 2 is set thereby for smallest fuel delivery.

At this operation the cam 44 attains the position 44'. However, the levers 48 and 50 do not follow this movement since the piston 74 in the cylinder 70 connected therewith cannot move upwardly because the valve 76 remains closed, the smallest upward movement of the piston 74 causing an extraordinarily high pressure in the oil above the piston which opposes the movement of the piston. This pressure propagates into the spaces 90 and 91 and opens the valve 86 affording oil flow inside of the housing 85 and through the opening 84 in the space of the housing 80 above piston 81. Thereby the piston 81 is pressed downwardly corresponding to the amount of fluid slowly passing through the valve 86. Thereby the piston 74 is downwardly displaced correspondingly to the amount of fluid discharged from the interior of the cylinder 70 into the space above the slide valve 81. Due to the suction effect below the piston 74, the valve 69 opens and so much oil is allowed to pass out of the interior of the cylinder 72 as space is provided by the movement of the piston 74.

If the vehicle driver does not reopen the throttle, after some time, for example after ten seconds, the piston 81 provides a free passage for the oil contained in the channel 91 through the openings 92 and 93.

Thereby oil, due to the excess pressure obtaining above the piston 74 is conducted into the interior of the cylinder 70 below the piston 74. The piston 74 now moves upwardly due to the pressure of spring 52. The rods 65 and 55, the levers 59 and 48, 57 and 58 and the fingers 59 and 60 can now move toward the positions shown in dotted lines. The pistons 61 and 62 follow the fingers due to expansion of the springs 17 and 18 and thereby the gear changing speeds are reduced to a value corresponding to the position of the lever 48 bearing against the cam 44 in the position 48'. Gear changes are now effected in the gear box by means of the automatic gear changing mechanism.

If the vehicle driver again opens the throttle, the lever 47 as well as the lever 48 follow the cams 43 and 44. The movement of the levers 48 and 50 and of the rods 55 and 65 together with the downward movement of the piston 74 is not restrained since the valve 76 allows the oil to pass from the lower to the upper side of the piston 74. Simultaneously also, the oil from the space above the slide valve 81 returning upwardly by the action of the spring 82 is urged back through the throttle bore 88 and the surplus oil in the system passes back through the throttle bore 69' into the interior of the oil reservoir 72. Thus the original condition of the delay mechanism is reproduced.

In the embodiment shown in Fig. 2 several clockwise revolutions of the hand wheel 109 are necessary to change the fuel control mechanism from the zero position shown by dashed lines to the position for maximum delivery rate of the fuel pump 102 because of the ratio of the transmission 111, 112, 113. The shaft 114 is rotated about three quarters of a revolution during the aforesaid operation, the required delivery rate of the fuel pump being adjusted by means of the levers 106 and 105, the rod 104 and the lever 103. Simultaneously with the setting of the fuel pump the levers 117 and 119 are moved from the dashed line position to the position shown in full lines by means of the cam 116. The gear changing speeds corresponding to the selected engine output are increased by means of the rod 55 in similar manner to that of the embodiment shown in Fig. 1. If the vehicle driver wishes to lower the engine output for a short time only and thereby gear changes are not desired, he presses the lever 130 downwards. The lever 105 is thereby moved downwardly by the knob 136 of the rod 135 as a result of which the lever 106 is pulled away from the cam 115 and the levers 106, 105 and 103 attain the position drawn dashed 106', 105', 103' shown in dashed lines. The fuel pump 102 is thereby set for light running. The levers 117 and 119 and the rod 55 remain connected to the cam 116 and the gear change speeds therefore remain unchanged.

The vehicle driver can obtain the previously used setting of the fuel pump by releasing the hand lever 130 as soon as this is permitted by the road conditions. For the whole time during which the vehicle was run with reduced engine output the gear change speeds remained unchanged at their originally selected value. Therefore no gear changes take place in the gear box as long as the speed of travel does not fall substantially.

I claim:

1. A fuel supply and power transmission control system for vehicles driven by an internal combustion engine, comprising, in combination, fuel supply control means for controlling the fuel supply to the engine, a change speed gear transmission driven by the internal combustion engine, change speed gear control means connected with said transmission, adjustable speed responsive means connected with the internal combustion engine and being responsive to the operating speed thereof and being connected with said change speed gear control means for actuating the latter, adjusting means connectable with said fuel supply control means to be actuated by the latter when connected thereto and connected with said speed responsive means for adjusting the effect of the latter on said change speed gear control means, and automatic action delaying means connected with said adjusting means for delaying the action of the latter on said speed responsive means upon a reduction of the fuel supply.

2. A system as defined in claim 1 in which said delaying means comprise a first cylinder, a piston reciprocable in said first cylinder, a piston rod connecting said piston with said adjusting means, a passage in said piston connecting the spaces of said first cylinder at both sides of said piston, a valve in said passage adapted to close said passage upon movement of said piston and of said adjusting means connected thereto in one direction and to open said passage upon movement of said piston and of said adjusting means in the opposite direction, a compartment having an aperture communicating with the space in said first cylinder on the head side of said piston, a spring loaded valve in said compartment for closing said aperture, a second cylinder, communicating with the interior of said compartment, a spring actuated slide valve in said second cylinder, a port controlled by said slide valve connecting the interior of said second cylinder with the space in said first cylinder on the piston rod side of said piston, an aperture controlled by said slide valve in said second cylinder, a channel connecting said first cylinder with said aperture, a chamber communicating with the space of said first cylinder on the piston rod side of said piston, a reservoir, a channel connecting said reservoir with said chamber, a spring loaded valve in said chamber for closing said channel, a throttling orifice in said last mentioned valve connecting said chamber with said channel, and a liquid filling said cylinders, said compartment, said chamber, and said reservoir.

3. A fuel supply and power transmission control system for vehicles driven by an internal combustion engine, comprising, in combination, fuel supply control means for controlling the fuel supply to the engine, actuating means for said fuel supply control means, a change speed gear transmission driven by the internal combustion engine, change speed gear control means connected with said transmission, adjustable speed responsive means connected with and being responsive to the operating speed of the internal combustion engine and connected with said change speed gear control means for actuating the latter, adjusting means connectable with said fuel supply control actuating means and connected with said speed responsive means for adjusting the speed at which they respond for actuating said change speed gear control means, and a mechanism adapted to connect said adjusting means to said actuating means for said fuel supply control means for actuation of said adjusting means by said actuating means, said mechanism comprising delaying means affording substantially unresisted connection of said adjusting means with said fuel supply control actuating means upon movement of said adjusting means in a direction for increasing the responsive speed of said speed responsive means and resisting connection of said adjusting means with said fuel supply control actuating means upon movement of said adjusting means in the opposite direction.

4. A fuel supply and power transmission control system for vehicles driven by an internal combustion engine, comprising, in combination, fuel supply control means for controlling the fuel supply to the engine, actuating means for said fuel supply control means, a change speed gear transmission driven by the internal combustion engine, change speed gear control means connected with said transmission, adjustable speed responsive means connected with and being responsive to the operating speed of the internal combustion engine and connected with said change speed gear control means for actuating the latter, adjusting means connected with said actuating means for the fuel supply control means and with said speed responsive means for adjusting the speed at which they actuate said change speed gear control means, and an additional actuating device for said fuel supply control means adapted to actuate said fuel supply control means independently of said actuating means and without affecting said adjusting means.

5. A fuel supply and power transmission control system for vehicles driven by an internal combustion engine, comprising, in combination, fuel supply control means for controlling the fuel supply to the engine, actuating means for said fuel supply control means, a change speed gear transmission driven by the internal combustion engine, change speed gear control means connected with said transmission, adjustable speed responsive means connected with and being responsive to the operating speed of the internal combustion engine and connected with said change speed gear control means for actuating the latter, adjusting means connectable with said fuel supply control means and connected with said speed responsive means for adjusting the speed at which said speed responsive means respond for actuating said change speed gear control means, a mechanism adapted to connect said adjusting means to said actuating means for said fuel supply control means for actuation of said adjusting means by said actuating means, and means temporarily interrupting connection of said adjusting means with said actuating means when the latter are suddenly moved in a direction for reducing the fuel supply.

References Cited in the file of this patent

UNITED STATES PATENTS

| Number | Name | Date |
|---|---|---|
| 905,637 | Beskow | Dec. 1, 1908 |
| 1,882,805 | Gillett | Oct. 18, 1932 |
| 2,071,785 | Ehrlich | Feb. 23, 1937 |
| 2,039,590 | Walti | Aug. 10, 1937 |
| 2,136,760 | Saives | Nov. 15, 1938 |
| 2,207,481 | Derungs | July 9, 1940 |
| 2,330,581 | Hefel | Sept. 28, 1943 |
| 2,352,212 | Lang | June 27, 1944 |
| 2,411,463 | Pozgay | Nov. 19, 1946 |

FOREIGN PATENTS

| Number | Country | Date |
|---|---|---|
| 875,016 | France | Sept. 3, 1942 |
| 889,074 | France | Dec. 30, 1943 |
| 890,868 | France | Feb. 21, 1944 |